Nov. 28, 1967  T. A. OVERBY  3,354,551
LAND MEASURING DEVICE
Filed Oct. 23, 1965  2 Sheets-Sheet 1
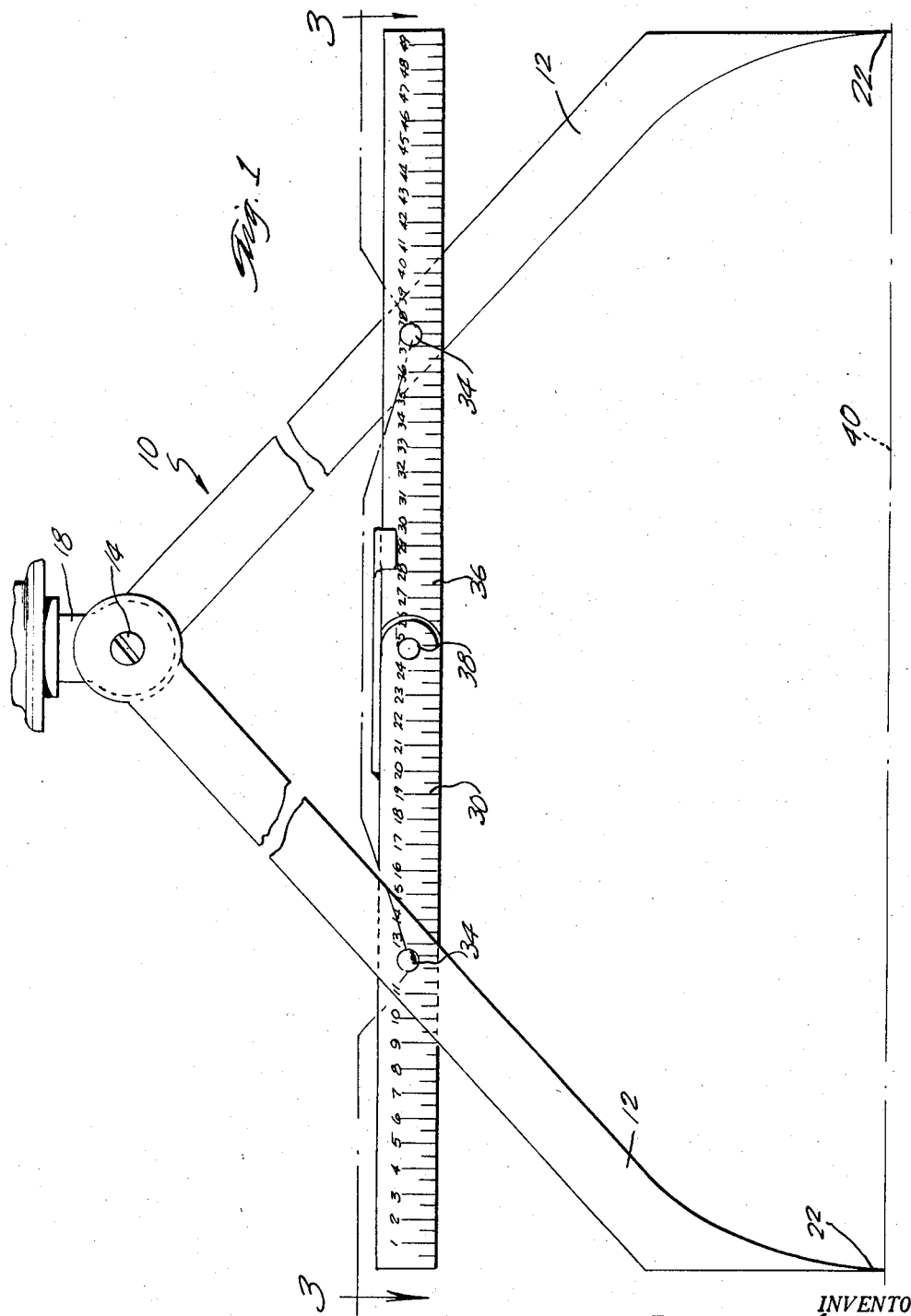
INVENTOR.
THEODORE A. OVERBY
BY
Victor J. Evans & Co.
ATTORNEYS Nov. 28, 1967  T. A. OVERBY  3,354,551
LAND MEASURING DEVICE
Filed Oct. 23, 1965
2 Sheets-Sheet 2
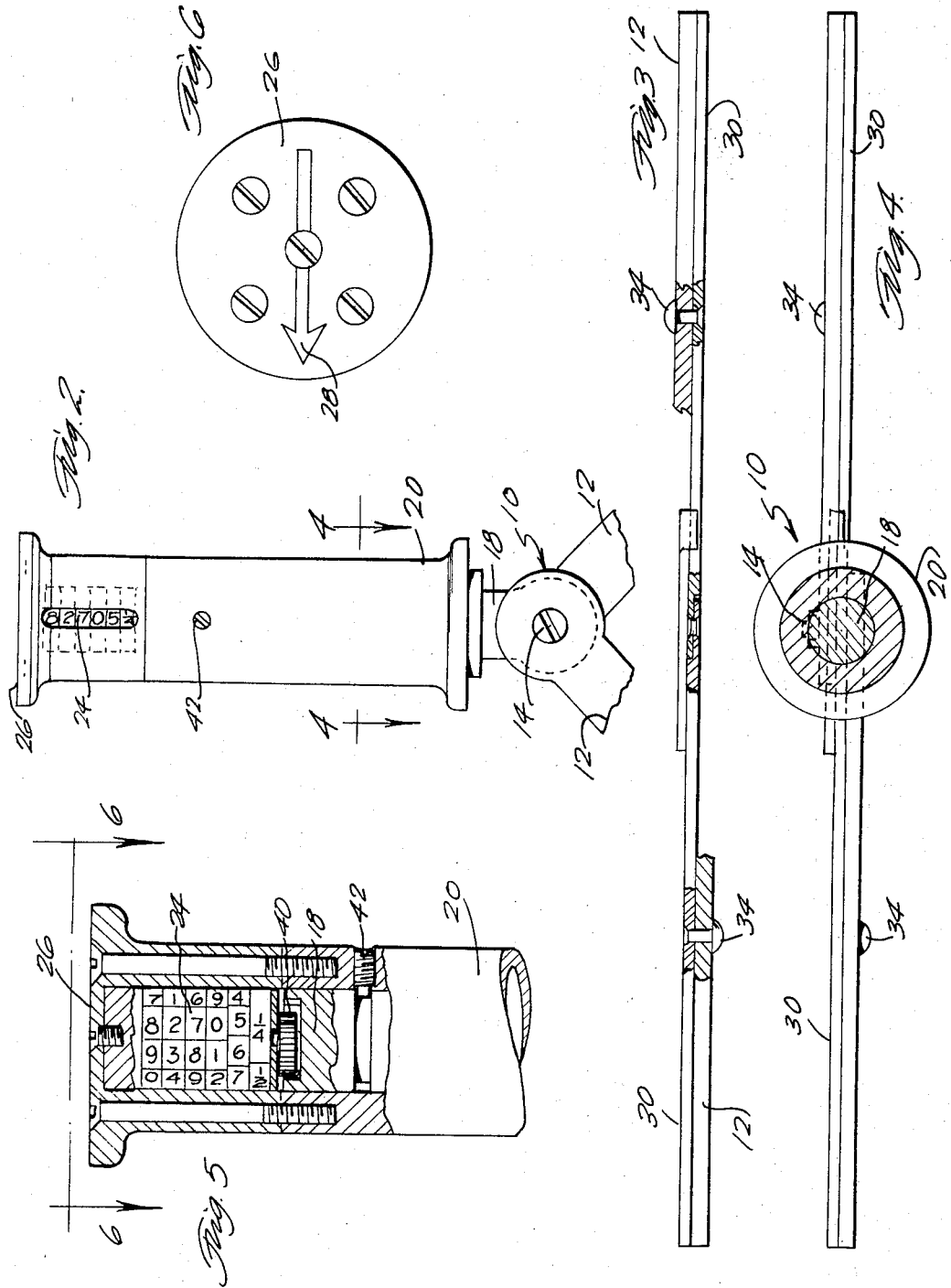
INVENTOR.
THEODORE A. OVERBY
BY
Victor J. Evans
ATTORNEYS

United States Patent Office 3,354,551
Patented Nov. 28, 1967

3,354,551
LAND MEASURING DEVICE
Theodore A. Overby, 411 11th Ave. SE.,
Aberdeen, S. Dak. 57401
Filed Oct. 23, 1965, Ser. No. 503,195
1 Claim. (Cl. 33—148)

ABSTRACT OF THE DISCLOSURE

A land measuring device having a pair of legs, a counter-actuated arm, a rotatable cap and case member, a pivotally mounted ruler being supported at intermediate points of the legs and being mounted parallel to a line constructed between the free ends of the legs, the pivotal ruler also being adapted to indicate the measure between the end points of the legs, and having indicia comprising an arrow adapted to point in the direction in which the distance is to be measured as the legs are rotated about each other in stepping off the distances being measured.

---

The present invention relates to distance measuring instruments and is particularly useful when applied in measuring long distances along a given line or a series of lines that are connected together, and more particularly the invention relates to land measuring devices that record the distances that have been measured by the instrument.

An object of the present invention, therefore, is to provide a very simple and effective counter connected on the land measuring device for recording the distance that the land measuring device has stepped off.

A further object of the present invention is to provide accuracy and convenience in measuring distances on land, and the like.

A further object of the present invention is to provide a land measuring device that has a pair of legs that are pivotally connected together, a case and counter means mounted distally from the pivot means of the measuring device, and a rotatable cap member disposed on the free end of the case, so that as the indicia on the rotatable cap member are held and the legs are used to step off the distances as one leg is rotated over the other, then the counter is used and provides the total or integrated distance that the land measuring device has traveled in stepping off the distance along a given line.

The above and other objects and advantages of the invention will become apparent upon full consideration of the following detailed description and accompanying drawings in which:

FIG. 1 is a front view of the land measuring device according to a preferred embodiment of the invention, showing the legs and pivot means thereof and in which the case and counter means are shown broken away therefrom;

FIG. 2 shows the case and counter means as provided from the pivot means of FIG. 1;

FIG. 3 shows a view of the measuring ruler along lines 3—3 of FIG. 1;

FIG. 4 is a cross-sectional view taken along lines 4—4 of FIG. 2;

FIG. 5 is a cross-sectional view of the counter showing the manner in which the case is caused to actuate the counter as the central shaft thereof is rotated about the case; and FIG. 6 shows a plan view taken along lines 6—6 of FIG. 5 showing the indicia disposed on the cover or case member.

Referring now to the drawings, there is shown a land measuring device 10 having a pair of arcuately contoured legs 12, 12 connected at one end thereof by pivot means 14, and from which there is a counter mounting arm 18 and a counter casing 20.

The free ends 22, 22 of the legs 12, 12, respectively, are generally adjusted for measuring a given distance, such as several feet, a quarter of a rod, or other units of measure. Correspondingly, the counter 24 that is actuable by the counter arm 18 in the casing 20 is similarly calibrated to rotate and record distances that are measured between the free ends 22, 22. The cover 20 is provided with a cap or end 26 having an indicia 28 thereon, as shown in FIG. 6, so that as the cover 20 is grasped in one hand and the indicia is pointed to the direction in which the measurement is sought to be recorded, then as the legs 12, 12 are stepped off and the free ends 22, 22 are applied along the given line to be measured, and generally the legs are turned about each other in a counterclockwise direction, then the counter records that number of unit measure that has been stepped off by the legs. Thus the handle or cover 20 has been grasped and the indicia 28 are pointed in the direction of movement, and the legs are swung in a counterclockwise direction for achieving the actuation of the counter in the given direction.

When the operator of the land measuring device comes proximate the end of the line being measured, he will usually have a fraction of one length of measure which remains to be accounted for in the measuring device of the invention.

It is seen that a pivoted or flexible rule 30 is of a length comparable to the length between points 22, 22 and the rule is mounted parallel to a line between the points 22, 22 and from an intermediate point of the legs by a hinge, rivet or pivot means 34, 34. The rule 30 is provided with measures of indicia 36. By the operator sighting downwardly from the indicia 36 to the end of the line being measured, such as at point 40, then the operator can determine the precise distance to be added to the counter 24 by means of rotation of the case 20 so that the distance measured from the unit end 42 of the rule 30 to the point on the rule 30 immediately over the point 40 on the ground, the precise and exact distance of the line being measured is recorded and indicated on the counter 24. In summary, this is completed by the operator when nearing the finish of the line, and seeing that there is less than a full measure to the line, he should not swing the legs in the counterclockwise direction, but lift it up and set the front leg on the line so that the rear leg at the point last measured, and the forward leg 12 is beyond the end of the line. Then the operator sights downwardly from the measuring rule 30 to the line to the point 40 being measured, and that distance as indicated on the measuring rule 30 is then added to the counter 24. The rule 30 is adapted to be folded with the legs 12, 12, by the pivot means 38 allowing the rule 30 to be folded as the rule pivots about pivot means 34, 34, as is well known.

The counter 24 is a conventional type such as a tachometer or other type of rotary counter means, and is actuable by rotational displacement relative between the arm 18 and the case 20. FIG. 5 shows the components of the counter together with the actuation coupling means 40, as well as a retaining means or set screw 42 for retaining the arm 18 and the cover 20 in their relative positions.

Additional embodiments of the invention in this specification will occur to others and therefore it is intended that the scope of the invention be limited only by the appended claim and not by the embodiment described hereinabove. Accordingly, reference should be made to the following claim in determining the full scope of the invention.

What is claimed is:

A land measuring device comprising a pair of arcuate legs connected at pivot means, a counter and counter-actuated arm mounted distally from said pivot means, a rotatable cap and case member for said counter and counter arm and mounted on the free end of said counter arm, said case having indicia disposed on an end thereof, said case member connected to actuate the counter so that as the case is held in the hand, the counter is turned as the legs are caused to step off measured distances, and the counter records the distances the legs have stepped off, a pivotally mounted ruler being supported at intermediate points of said legs and being mounted parallel to a line constructed between the free ends of said legs, said rule being divided into two portions which are pivotally connected, said pivoted ruler being adapted to indicate the measure between the end points of the legs, and said indicia comprising an arrow adapted to point in the direction in which the distance is to be measured as the legs are rotated about each other in stepping the distances being measured.

References Cited

UNITED STATES PATENTS

| 1,117,064 | 11/1914 | Landaiche | 235—91 |
| 3,014,281 | 12/1961 | Caporicci | 33—149 |
| 3,129,514 | 4/1964 | Lintner | 33—149 |
| 3,173,211 | 3/1965 | Williams | 33—191 |

FOREIGN PATENTS

| 380,711 | 10/1907 | France. |
| 57,031 | 7/1924 | Sweden. |

LEONARD FORMAN, *Primary Examiner.*

WILLIAM D. MARTIN, JR., *Assistant Examiner.*